(12) United States Patent
Watanabe

(10) Patent No.: US 9,531,910 B2
(45) Date of Patent: Dec. 27, 2016

(54) NON-TRANSITORY COMPUTER-READABLE STORAGE MEDIUM STORING PROGRAM, TERMINAL DEVICE AND METHOD

(71) Applicant: Brother Kogyo Kabushiki Kaisha, Nagoya-shi, Aichi-ken (JP)

(72) Inventor: Mitsuaki Watanabe, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 7 days.

(21) Appl. No.: 14/664,292

(22) Filed: Mar. 20, 2015

(65) Prior Publication Data

US 2015/0281476 A1 Oct. 1, 2015

(30) Foreign Application Priority Data

Mar. 31, 2014 (JP) ................. 2014-072011

(51) Int. Cl.
*H04N 1/38* (2006.01)
(52) U.S. Cl.
CPC ...................... *H04N 1/38* (2013.01)
(58) Field of Classification Search
CPC ............. H04N 1/00244; H04N 1/2112
See application file for complete search history.

(56) References Cited

U.S. PATENT DOCUMENTS

| 7,024,053 | B2 | 4/2006 | Enomoto | |
|---|---|---|---|---|
| 2002/0071042 | A1 | 6/2002 | Enomoto | |
| 2011/0249073 | A1* | 10/2011 | Cranfill | H04N 7/147 348/14.02 |

FOREIGN PATENT DOCUMENTS

| JP | H05-328342 A | 12/1993 |
|---|---|---|
| JP | H11-289447 A | 10/1999 |
| JP | 2002-171398 A | 6/2002 |

* cited by examiner

*Primary Examiner* — Twyler Haskins
*Assistant Examiner* — Padma Haliyur
(74) *Attorney, Agent, or Firm* — Banner & Witcoff, Ltd.

(57) ABSTRACT

A non-transitory computer-readable storage medium stores instructions including first generating processing, first determination processing, second determination processing, second generating processing, and third determination processing for a terminal device with a camera. The first generating processing generates extracted image data from captured image data acquired by the camera. The first determination processing determines representative luminance values respectively representing luminances of the extracted image data. The second determination processing determines luminance correction values with respect to each of the plurality of extracted image data, based on a reference luminance value and the representative luminance values. The second generating processing generates composite image data from the extracted image data. The luminance of each extracted image data has been corrected using the luminance correction values. The third determination processing determines, based on the luminance correction values, an exposure correction value to correct an exposure of the camera.

13 Claims, 10 Drawing Sheets

NON-TRANSITORY COMPUTER-READABLE STORAGE MEDIUM STORING PROGRAM, TERMINAL DEVICE AND METHOD

CROSS-REFERENCE TO RELATED APPLICATION

This application claims priority to Japanese Patent Application No. 2014-072011 filed Mar. 31, 2014, the content of which is hereby incorporated herein by reference.

BACKGROUND

The present disclosure relates to a non-transitory computer-readable storage medium storing a program, a terminal device and a method that are capable of performing a remote conference by performing the transmission and reception of various data via a network.

In known art, a terminal device is known that can be connected to a plurality of terminal devices, such as a mobile terminal, a personal computer (PC) and the like, via a network, and can perform a remote conference by the transmission and reception of various data, including image data, between the terminal devices. For example, as the terminal device, a video communication device is known that transmits a video signal of a captured image captured by an imaging device (a camera) to another video communication device. When the video communication device receives, from the other video communication device, a control signal that specifies an area of part of the captured image, the video communication device extracts an image of the specified area from the captured image. The video communication device transmits a video signal of the extracted image to the video communication device that transmitted the control signal specifying the area. Further, when the video communication device receives, from the other video communication device, a control signal that specifies a plurality of areas in the captured image, the video communication device respectively extracts images of the specified plurality of areas from the captured image. The video communication device generates a composite image in which the extracted plurality of images are combined as a single image. The video communication device transmits a video signal of the composite image to the video communication device that transmitted the control signal specifying the areas.

SUMMARY

Aspects described herein may provide a non-transitory computer-readable storage medium storing computer-readable instructions. When executed by a processor of a terminal device, which is configured to perform transmission and reception of various data with a plurality of terminal devices connected via a network, perform processes. The processes include first generating processing, first determination processing, second determination processing, storage processing, second generating processing, and third determination processing. The first generating processing generates extracted image data from captured image data acquired by a camera connected to the terminal device. The extracted image data correspond to portions in the captured image data. The extracted image data includes a target to be extracted from the image data. The first determination processing determines a plurality of representative luminance values respectively representing luminances of the extracted image data. The second determination processing determines a plurality of luminance correction values with respect to each of the plurality of extracted image data, based on a reference luminance value and the plurality of representative luminance values determined in the first determination processing. The reference luminance value is a reference value of luminance. The storage processing stores the plurality of luminance correction values determined in the second determination processing in a storage device provided in the terminal device. The second generating processing generates composite image data from the extracted image data. The luminance of each of the plurality of extracted image data has been corrected using the plurality of luminance correction values stored in the storage device in the storage processing with respect to each of the extracted image data to which the luminance correction values respectively correspond. The third determination processing determining, based on the plurality of luminance correction values stored in the storage device in the storage processing, an exposure correction value to correct an exposure of the camera.

Aspects described herein may also provide a terminal device performing transmission and reception of various data with a plurality of terminal devices configured to be connected via a network. The terminal device includes a processor and a memory. The memory stores computer-readable instructions. The instructions, when executed by the processor, perform processes. The processes include first generating processing, first determination processing, second determination processing, storage processing, second generating processing, and third determination processing. The first generating processing generates extracted image data from captured image data acquired by a camera connected to the terminal device. The extracted image data correspond to portions in the captured image data. The extracted image data includes a target to be extracted from the image data. The first determination processing determines a plurality of representative luminance values respectively representing luminances of the extracted image data. The second determination processing determines a plurality of luminance correction values with respect to each of the plurality of extracted image data, based on a reference luminance value and the plurality of representative luminance values determined in the first determination processing. The reference luminance value is a reference value of luminance. The storage processing stores the plurality of luminance correction values determined in the second determination processing in the memory. The second generating processing generates composite image data from the extracted image data. The luminance of each of the plurality of extracted image data has been corrected using the plurality of luminance correction values stored in the memory in the storage processing with respect to each of the extracted image data to which the luminance correction values respectively correspond. The third determination processing determines, based on the plurality of luminance correction values stored in the memory in the storage processing, an exposure correction value to correct an exposure of the camera.

Aspects described herein may further provide a method executed by a processor of a terminal device, which performs transmission and reception of various data with a plurality of terminal devices configured to be connected via a network. The method includes first generating extracted image data from captured image data acquired by a camera connected to the terminal device. The extracted image data correspond to portions in the captured image data. The extracted image data includes a target to be extracted from the image data. The method also includes first determining a plurality of representative luminance values respectively representing luminances of the extracted image data. The method also includes second determining a plurality of luminance correction values with respect to each of the plurality of extracted image data, based on a reference luminance value and the plurality of representative luminance values determined in the first determining. The reference luminance value is a reference value of luminance. The method also includes storing the plurality of luminance correction values determined in the second determining in a storage device provided in the terminal device. The method also includes second generating composite image data from the extracted image data. The luminance of each of the plurality of extracted image data has been corrected using the plurality of luminance correction values stored in the storage device with respect to each of the extracted image data to which the luminance correction values respectively correspond. The method also includes third determining, based on the plurality of luminance correction values stored in the storage processing, an exposure correction value to correct an exposure of the camera.

BRIEF DESCRIPTION OF THE DRAWINGS

Embodiments will be described below in detail with reference to the accompanying drawings in which.

DETAILED DESCRIPTION

Figure 1:
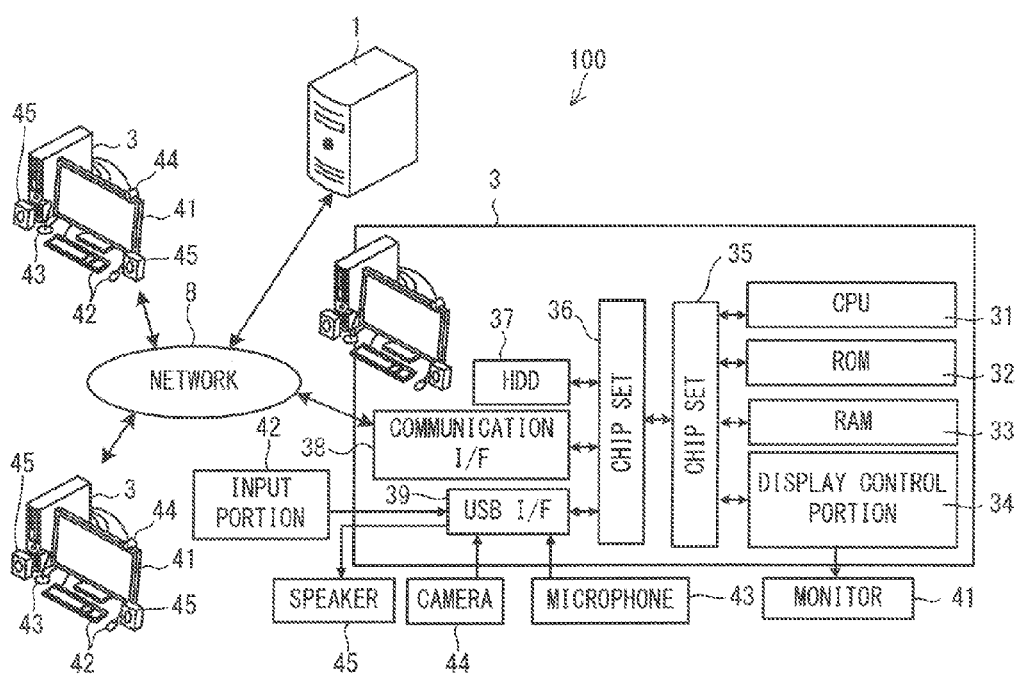
FIG. 1 is a schematic overview of a remote conference system 100.

Within an angle of view of a camera, an image capture target of the camera is influenced by light from a light source that illuminates the angle of view of the camera, depending on various factors, such as a position, orientation, size etc. of the image capture target of the camera. When there are a plurality of image capture targets, the influence of the light on the individual image capture targets may differ for each of the image capture targets. For example, when the image capture targets are human faces, as the influence of the light on each of the individual faces is different as a result of various factors, a single captured image may include images of light faces and images of dark faces. The light source also causes the light to influence other aspects, such as the background and stationary objects etc., and not just the image capture targets. Further, a direction of the light from the light source is the same with respect to everything within an angle of view of the camera. As a result, even when the captured image includes the images of light faces and the images of dark faces, changes in luminance within the image form a natural image in which, in the image as a whole, the luminance changes continuously based on the direction of the light.

However, when a plurality of areas that respectively include individual image capture targets are extracted from the captured image, depending on the influence of the light on the image capture targets included in the extracted areas, variations in brightness occur in the individual images. As a result, when the extracted images are simply combined as a single image, in the resulting composite image, the luminance varies for each of areas occupied by the original extracted images. Therefore, changes in the luminance within the combined image are not based on the direction of the light in the image as a whole, and it is possible that an unnatural image is obtained in which the changes in luminance are not continuous.

In addition, when the images of the light faces and the images of the dark faces are included in the single composite image, as it is difficult to distinguish the expressions of the faces, a problem may arise in which it is difficult to use the composite image in a remote conference. If a terminal device performs luminance correction with respect to each of the images extracted from the captured image, it is possible to generate a composite image in which variations in the luminance are reduced. However, the captured image that is used in the remote conference is a frame image that is continuously displayed as video. Thus, if luminance correction is performed on each frame, it is possible that a CPU processing load may be increased in the terminal device.

The present disclosure, for example, provides a non-transitory computer-readable storage medium storing a program, a terminal device and a method that are capable of correcting the luminance of images extracted from a captured image and generating a composite image, and are also capable of correcting a camera exposure using an adjustment value that accords with a luminance correction value.

Hereinafter, an embodiment of the present disclosure will be explained with reference to the drawings. The drawings referred to are used to explain technological features that can be adopted by the present disclosure. Configurations of devices noted in the drawings, and flowcharts of various processing etc. are not limited only to the examples given and are simply explanatory examples.

A remote conference system 100 that includes terminals 3 according to the present embodiment will be explained with reference to FIG. 1. The remote conference system 100 is a system that can hold a remote conference (e.g., web conference or a television conference) that uses images and audio. The remote conference system 100 includes a conference server 1 and the plurality of terminals 3. The conference server 1 and the plurality of terminals 3 are connected each other via a network 8. In the remote conference system 100, the plurality of terminals 3 respectively participate, virtually and via the network 8, in a conference of a conference room that is virtually established by the conference server 1. Each of the terminals 3 is used by a user participating in the remote conference. The conference server 1 controls the remote conference that is being held between the plurality of terminals 3.

The remote conference system 100 shown in FIG. 1 is a system in which, as an example, the single conference server 1 and three of the terminals 3 are respectively connected via the network 8. The conference server 1 virtually establishes a conference room, as a forum for the remote conference being held using the plurality of terminals 3, and manages each of the terminals 3 entering or leaving the conference room. The virtual conference room is identified by a predetermined conference room ID. The plurality of terminals 3 participate in the same remote conference that is identified by the predetermined conference room ID. Further, the plurality of terminals 3 are respectively identified by user IDs. For example, the user IDs of the plurality of terminals 3 participating in the same remote conference are associated with the predetermined conference room ID and stored in a storage device (such as a RAM, or a hard disk drive (hereinafter referred to as an "HDD"), for example) of the conference server 1. The plurality of terminals 3 are connected to the conference server 1 via the network 8 and transmit data of images (video) captured by the respective terminals 3 and audio collected by the respective terminals 3 to the conference server 1, along with the conference room ID. The conference server 1 transmits data of the received images (video) and audio to each of the plurality of terminals 3 that are identified by the user IDs associated with the conference room ID that is received along with the data of the images and audio. With this configuration, the plurality of terminals 3 can mutually transmit and receive data of images (video) and audio acquired by each of the terminals 3 and can perform the remote conference through real time conversation. The conference server 1 is configured in a similar manner to a known work station or personal computer (PC) configuration, except for the point that various processing programs, which allow a remote conference between the plurality of terminals 3 that are connected to the conference server 1 to be performed, are stored in the storage device of the conference server 1. An explanation of the electrical configuration of the conference server 1 is therefore omitted here.

A monitor 41, a microphone 43, a camera 44 and a speaker 45 etc. are connected to the terminal 3. A PC can be used as the terminal 3, for example. A portable terminal, such as a smart phone, a tablet terminal or the like may also be used as the terminal 3. At the time of the remote conference, one of the terminals 3 transmits image data captured by the camera 44 and audio data collected by the microphone 43 to the conference server 1, along with the conference room ID. The image data and the audio data are transmitted via the conference server 1 to the other terminals 3 that are participating in the remote conference identified by the conference room ID. Further, the one terminal 3 displays an image on the monitor 41 based on image data received from the other terminals 3 via the conference server 1. The one terminal 3 outputs audio from the speaker 45 based on audio data received from the other terminals 3. As a result, in the remote conference system 100, the image data and audio data transmitted from the plurality of terminals 3 are shared between the plurality of terminals 3. Even when all the participants (all the users of the terminals 3) in the remote conference system 100 are not in the same place, the remote conference system 100 can provide a forum for a smooth conference between the participants. Note that, as the control of the remote conference performed by the conference server 1 in the remote conference system 100 is the same as in known art, a detailed explanation thereof is omitted here. Further, in the present embodiment, of the image data and the audio data transmitted and received between the terminals 3, the control of the transmission and reception of the image data will be explained, and an explanation of the control of the transmission and reception of the audio data will be simplified.

An electrical configuration of the terminal 3 will be explained. The terminal 3 is a PC having a known configuration, and is provided with a CPU 31 that controls the terminal 3. The CPU 31 is connected to a chip set 35, and is electrically connected to a ROM 32, a RAM 33 and a display control portion 34, via the chip set 35. The chip set 35 is connected to a chip set 36. The CPU 31 is electrically connected to an HDD 37, a communication I/F 38 and a USB I/F 39 via the chip set 36.

The chip set 35 is a series of circuits that manage the transmission and reception of data between the CPU 31 and the ROM 32, the RAM 33 and the display control portion 34. A boot program, a BIOS and the like are stored in the ROM 32. Various temporary data are stored in the RAM 33. The display control portion 34 controls display of images on the monitor 41. The chip set 36 is a series of circuits that manage the transmission and reception of data between the CPU 31 and the HDD 37, the communication I/F 38 and the USB I/F 39. An OS, software that causes the terminal 3 to function as a client (a remote conference program that will be explained later) and other various applications and data etc. are stored in the HDD 37. The communication I/F 38 is connected wirelessly or by a hard-wired connection to the network 8 and is an interface to perform data communication.

It should be noted that the remote conference program that will be explained later is compiled as a code depending on the terminal 3, and is saved in a computer-readable storage device that is provided in a file server (not shown in the drawings), the conference server 1 or the like. The remote conference program is provided by being transmitted from the file server, the conference server 1 etc. to each of the terminals 3 as a transitory transmission signal, via a telecommunications line of the network 8 or the like. Alternatively, the remote conference program may be provided by being stored in a non-transitory computer-readable storage medium (not shown in the drawings), such as a CD-ROM, a DVD-ROM, a flash ROM or the like, and by the CPU 31 of the terminal 3 using a reader (not shown in the drawings) that can be connected to the terminal 3 to read out the remote conference program from the non-transitory computer-readable storage medium. The CPU 31 stores the remote conference program in a storage device that can be read by a computer provided in the terminal 3. In the present embodiment, the storage device is the HDD 37, but the storage device is not limited to the HDD 37 and may be a non-volatile storage device, for example, such as a solid state drive (SSD) or a flash ROM or the like. In other words, it is preferable for a non-transitory computer-readable storage medium, which can hold data irrespective of a length of time of storing the data, to be used as the storage device.

The USB I/F 39 is an interface to perform communication based on USB standards. The CPU 31 is electrically connected to an input portion 42, the microphone 43, the camera 44 and the speaker 45 via the USB I/F 39. The input portion 42 is a device, such as a keyboard, a mouse etc., that is used to input an operation on the terminal 3. The microphone 43 collects audio around the terminal 3, and transmits A/D converted (sampled) audio data to the OS via the USB I/F 39. The camera 44 captures images of the scenery around the terminal 3 and transmits A/D converted image data to the OS via the USB I/F 39. The camera 44 includes a two-dimensional imaging element, such as a CCD or a CMOS, and a lens system that focuses external light on the imaging element to form an image. The camera 44 further includes a conversion circuit that amplifies analog data output from the imaging element, performs A/D conversion and generates image data that is digital data. The speaker 45 performs D/A conversion on audio data received from the OS via the USB I/F 39 and outputs audio.

In the remote conference system 100, the CPU 31 of the terminal 3 performs the following various processing in accordance with the remote conference program. Using a known encoder, the CPU 31 encodes the audio data collected by the microphone 43 in accordance with predetermined audio parameters, and generates encoded audio data. The predetermined audio parameters are encoding conditions and are, for example, "use HE-AAC v2 as codec, set bit rate to 48 kbps (CBR) and set sampling rate to 24 kHz" or the like. The CPU 31 transmits the generated encoded audio data to the other terminals 3 via the conference server 1. When the CPU 31 of each of the other terminals 3 receives the encoded audio data, the CPU 31 uses a known decoder to decode the encoded audio data and generates audio data, then reproduces the audio data from the speaker 45.

In a similar manner, the CPU 31 uses a known encoder to compress the image data captured by the camera 44 in accordance with predetermined video parameters and generates encoded image data. The predetermined video parameters are encoding conditions and are, for example, "use H.265 as codec, set resolution to 1280×720p, 30 fps, and set bit rate to 1 Mbps (VBR)" or the like. The CPU 31 transmits the generated encoded image data to the other terminals 3 via the conference server 1. When the CPU 31 of each of the other terminals 3 receives the encoded image data, the CPU 31 uses a known decoder to decode the encoded image data and generates image data, then displays an image on the monitor 41.

Each of the above-described encoders and decoders is a program module that the CPU 31 calls up as appropriate in order to perform processing in the execution of the remote conference program. The encoders and the decoders are included in the remote conference program and are installed in the terminal 3 in advance. The basic software of the PC is a multi-tasking OS, and the remote conference program, the encoder and the decoder etc. can be executed by parallel processing. Note that, when the basic software is not a multi-tasking OS, each of the program modules may be activated based on an event interrupt from hardware or the like.

Further, various drivers (software) that respectively control the operations of various devices, such as the speaker 45, the camera 44, the microphone 43 and the display control portion 34, are each built into the basic software of the PC. Each of the drivers is installed in advance in the HDD 37, and is read into the RAM 33 at the time of the OS start up. The drivers are constantly executed by parallel processing. Via the OS, the CPU 31 respectively transmits a command to drive each of the drivers to the drivers corresponding to each of the devices. Each of the drivers outputs a control instruction to the respectively corresponding device in accordance with the command, and thereby controls the operation of each of the devices.

Among the various drivers, a camera driver that controls the operation of the camera 44 outputs a control instruction to the camera 44 in accordance with a control command transmitted by the CPU 31 via the OS, and thereby controls the operation of the camera 44. The control instruction output to the camera 44 by the camera driver includes an exposure setting instruction that sets an exposure of video captured by the camera 44. The exposure refers to a total amount of light to which the imaging element (not shown in the drawings), such as the CCD, provided in the camera 44 is exposed when the image data is captured. Therefore, the exposure also corresponds to the brightness of the video (image) captured by the imaging element. The exposure is determined by a combination of a lens aperture (f-number), a light exposure time and sensitivity of the imaging element etc.

In the execution of the remote conference program that will be explained later, the CPU 31 transmits, to the camera driver, a change command to change the exposure of the camera 44. The change command is a command that includes an exposure correction value indicating a change amount of the luminance value of the image data acquired from the camera 44 by the CPU 31. Note that luminance values of respective pixels that configure the image data are referred to collectively as the image data luminance value. The camera driver transmits exposure parameters (the f-number, the light exposure time and the sensitivity of the imaging element etc.), which are used to set the exposure of the camera 44, to the camera 44 as the exposure setting instruction. When the camera driver receives the change command from the CPU 31, the camera driver changes the exposure parameters in accordance with the exposure correction value and outputs the exposure parameters after the change to the camera 44 as the exposure setting instruction. The camera 44 changes the exposure in accordance with the exposure setting instruction and outputs the captured image data. It should be noted here that the camera driver need not correct the exposure of the camera 44 only through hardware correction due to the changes in the exposure parameters, but may also perform software correction by executing processing to change the luminance value on the image data captured by the camera 44.

Hereinafter, processing that is performed by the CPU 31 of the terminal 3 in the execution of the remote conference program and that is shown in FIG. 2 to FIG. 7 will be explained while referring as necessary to FIG. 8 to FIG. 10. Based on an operation input on the input portion 42, the CPU 31 of the terminal 3 reads out main processing (refer to FIG. 2) of the remote conference program from the HDD 37 and executes the main processing. Using initial settings at the time of execution of the remote conference program, the CPU 31 secures storage areas of a transmission buffer and a reception buffer respectively in the RAM 33. The transmission buffer is a storage area which temporarily stores the encoded audio data and the encoded image data transmitted by the CPU 31 to the other terminals 3 via the conference server 1. The reception buffer is a storage area which temporarily stores the encoded audio data and the encoded image data received by the CPU 31 from the other terminals 3 via the conference server 1.

Note that, in the present embodiment, the CPU 31 of the one terminal 3 stores the encoded audio data and the encoded image data generated in accordance with the execution of the remote conference program in the transmission buffer. In accordance with processing of the OS, the CPU 31 transmits the encoded audio data and the encoded image data stored in the transmission buffer to the conference server 1. The conference server 1 transmits the encoded audio data and the encoded image data received from the one terminal 3 to the other terminals 3. In a similar manner, the conference server 1 transmits the encoded audio data and the encoded image data received from the other terminals 3 to the one terminal 3. In accordance with processing of the OS, the CPU 31 of the one terminal 3 stores the encoded audio data and the encoded image data received from the conference server 1 in the reception buffer. The CPU 31 reads out the encoded audio data from the reception buffer in accordance with the execution of the remote conference program, and outputs audio to the speaker 45 based on the audio data. In a similar manner, the CPU 31 reads out the encoded image data from the reception buffer and causes video to be displayed on the monitor 41 based on the image data. Note that the CPU 31 of the one terminal 3 may transmit the encoded audio data and the encoded image data directly to each of the terminals 3, including to the conference server 1.

Figure 2:
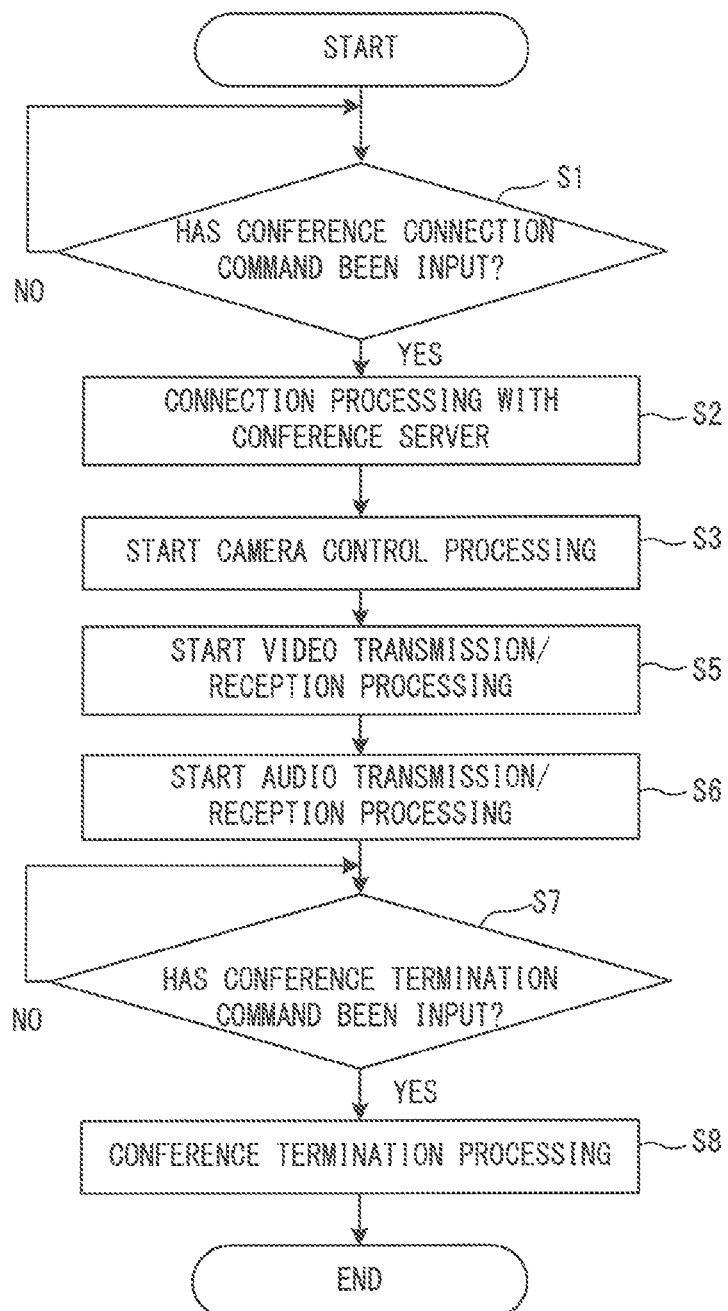
FIG. 2 is a flowchart of a remote conference program that is executed by a terminal 3.

As shown in FIG. 2, based on the operation input on the input portion 42, the CPU 31 of the one terminal 3 determines whether a command to connect the one terminal 3 to the conference server 1 has been received (step S1). More specifically, the CPU 31 receives, via the input portion 42, an input of the ID of the virtual conference room into which the user wishes to enter. For example, before the planned start of the remote conference, an electronic mail is transmitted from the conference server 1 addressed to each of electronic mail addresses of each user of the terminals 3 that are planning to participate in the remote conference. The electronic mails include a uniform resource locator (URL) for the remote conference in which the terminals 3 are to participate. The URL includes, for example, the virtual conference room ID as a query parameter. When an operation to select the URL is received by the input portion 42, the CPU 31 acquires the conference room ID input by the user. Based on the operation on the input portion 42, the CPU 31 stands by until the conference room ID is acquired (no at step S1).

When, based on the operation on the input portion 42, the CPU 31 acquires the conference room ID (yes at step S1), the CPU 31 attempts to connect to the conference server 1 via the network 8 (step S2). When the connection with the conference server 1 is established, the CPU 31 transmits an entry request to the conference server 1. The entry request includes the conference room ID and the user ID. When the conference room ID included in the entry request matches the predetermined conference room ID stored in the storage device of the conference server 1, the user ID included in the entry request is associated with the predetermined conference room ID and the associated data is stored in a storage device (not shown in the drawings) of the conference server 1. Then, based on the entry request, a notification is generated in the conference server 1 that allows participation in the conference in the existing conference room identified by the predetermined conference room ID. Further, when the conference room ID included in the entry request is not stored in the storage device of the conference server 1, in the conference server 1, the user ID included in the entry request is associated with the conference room ID and the associated data is stored in the storage device of the conference server 1. Then, based on the stored conference room ID, a virtual conference room is generated in the conference server 1, and, based on the entry request, a notification is generated that allows participation in the conference in this conference room. The CPU 31 receives the notification from the conference server 1, as a response to the entry request and that allows participation in the conference. The CPU 31 participates in the remote conference and allows the user to enter into the conference room that has been virtually generated by the conference server 1.

The CPU 31 starts camera control processing (step S3). The camera control processing is processing in which the CPU 31 causes the camera driver to activate the camera 44 and in which composite image data (to be explained later) is generated based on image data captured by the camera 44.

The camera control processing is continuously executed in parallel with the main processing of the remote conference program while the terminal 3 is participating in the remote conference. Details of the camera control processing will be explained later.

The CPU 31 starts video transmission/reception processing (step S5). The video transmission/reception processing is processing in which the encoded image data are transmitted and received between the one terminal 3 and the other terminals 3 via the conference server 1. The video transmission/reception processing is continuously executed in parallel with the main processing of the remote conference program while the terminal 3 is participating in the remote conference. Details of the video transmission/reception processing will be explained later.

The CPU 31 starts audio transmission/reception processing (step S6). The audio transmission/reception processing is processing in which the encoded audio data are transmitted and received between the one terminal 3 and the other terminals 3 via the conference server 1. The audio transmission/reception processing is continuously executed in parallel with the main processing of the remote conference program while the terminal 3 is participating in the remote conference.

As described above, in accordance with the OS, the CPU 31 receives the encoded audio data transmitted by the other terminals 3 via the conference server 1, and stores the received encoded audio data in the reception buffer. In the audio transmission/reception processing, the CPU 31 inputs the encoded audio data that has been read out from the reception buffer into the audio decoder, and acquires the audio data decoded according to the predetermined audio parameters. The CPU 31 stores the audio data in a predetermined storage area of the RAM 33. The CPU 31 transmits a command to the driver of the speaker 45 via the OS, and causes the audio based on the audio data to be output from the speaker 45. Further, the CPU 31 transmits a command to the driver of the microphone 43 via the OS, and causes the audio data of the audio collected by the microphone 43 to be stored in a predetermined storage area of the RAM 33. The CPU 31 inputs the audio data into the audio encoder, and acquires the encoded audio data that has been encoded according to the predetermined audio parameters. The CPU 31 stores the encoded audio data in the transmission buffer. In accordance with the OS, the CPU 31 transmits the encoded audio data stored in the transmission buffer to the other terminals 3 via the conference server 1. The CPU 31 continuously performs each of the above-described processing during the participation in the remote conference.

Next, the CPU 31 determines whether a command has been input to terminate the remote conference (step S7). When the command to terminate the remote conference has not been input (no at step S7), the processing stands by. During stand-by, the CPU 31 repeatedly and continuously performs the camera control processing, the video transmission/reception processing and the audio transmission/reception processing.

When the input portion 42 in one of the other terminals 3 has received the input of the operation to terminate the remote conference, for example, the conference server 1 transmits a notification that the remote conference is to be terminated to the one terminal 3. When the CPU 31 receives from the conference server 1 the notification that the remote conference is to be terminated, the CPU 31 determines that there has been input of a command to terminate the remote conference (yes at step S7). The CPU 31 also determines that there has been input of the command to terminate the remote conference when the input portion 42 in the one terminal 3 has received the input of the operation to terminate the remote conference.

The CPU 31 executes conference termination processing (step S8). The CPU 31 transmits a command to the driver that controls the operation of the microphone 43 to stop the processing that stores the audio data in the predetermined storage area of the RAM 33. The CPU 31 transmits a command to the driver that controls the operation of the speaker 45 to stop the processing that outputs the audio from the speaker based on the audio data. The CPU 31 transmits a command to the camera driver to stop the driving of the camera 44. The CPU 31 transmits a command to the driver that controls the operation of the display control portion 34 to stop the processing that displays the image on the monitor 41 based on the image data. The CPU 31 generates a notification event that notifies the termination of the remote conference. The CPU 31 transmits an exit request to the conference server 1, via the network 8, requesting exit from the virtual conference room. The exit request includes the conference room ID and the user ID. In the conference server 1, based on the conference room ID and the user ID included in the exit request, processing is performed that causes the terminal 3 identified by the user ID to exit the virtual conference room. In the conference server 1, the user ID associated with the predetermined conference room ID stored in the storage device is deleted. Then, in the conference server 1, a notification is generated based on the exit request, which notifies that the exit from the conference room is complete. Note that, in the conference server 1, when all of the user IDs associated with the predetermined conference room ID have been deleted, the virtual conference room is removed and the predetermined conference room ID is deleted from the storage device of the conference server 1. The CPU 31 receives the notification notifying that the exit from the conference room is complete from the conference server 1, as a response to the exit request. The CPU 31 ends the connection to the conference server 1 via the network 8 and terminates the execution of the remote conference program.

Figure 3:
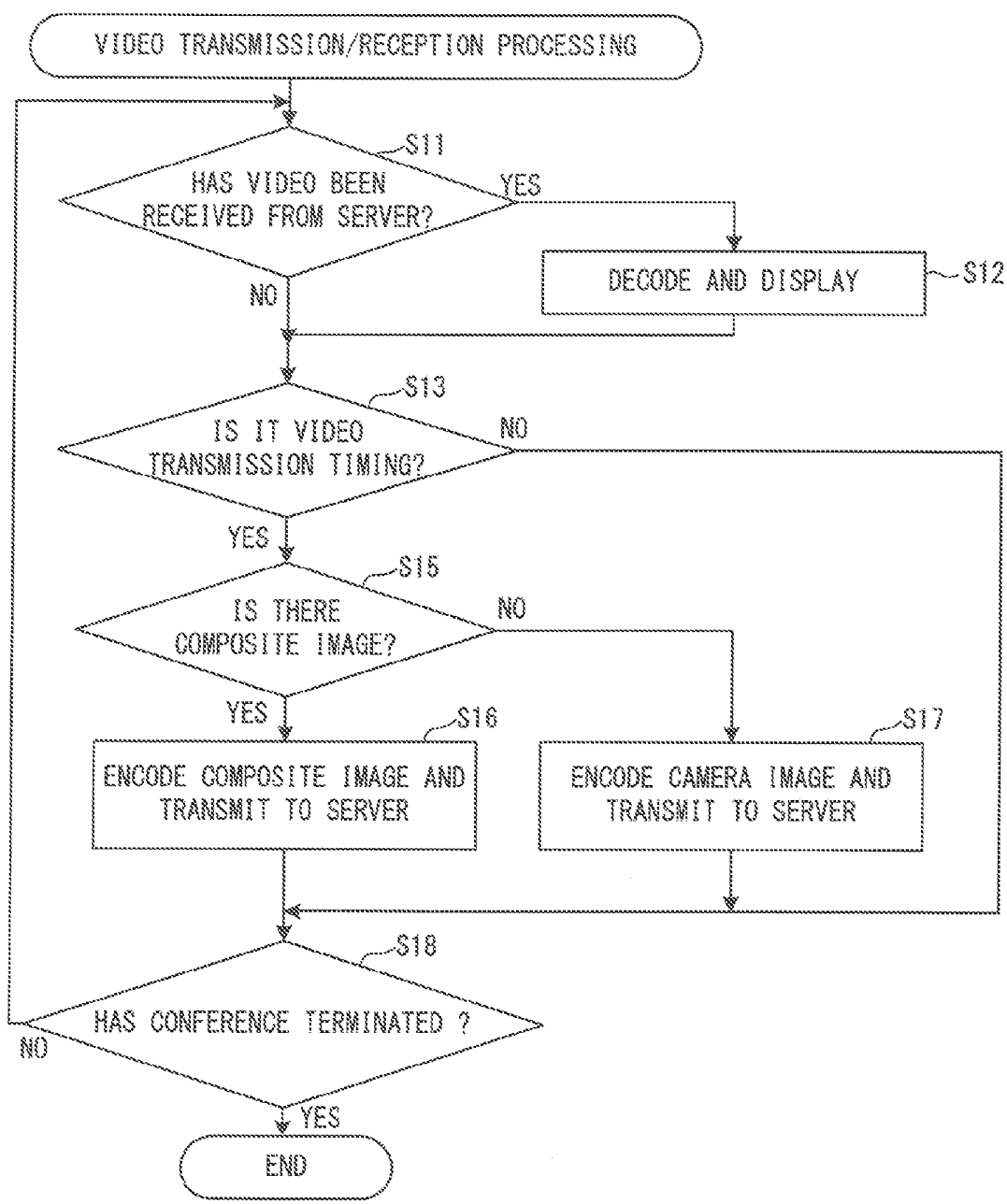
FIG. 3 is a flowchart of video transmission/reception processing in the execution of the remote conference program.

Next, the video transmission/reception processing that is started by the CPU 31 at step S5 of the main processing of the remote conference program will be explained in detail. As shown in FIG. 3, in the video transmission/reception processing, the CPU 31 determines whether encoded image data is stored in the reception buffer (step S11). When, the encoded image data received by the OS from the conference server 1 is not stored in the reception buffer (no at step S11), the CPU 31 advances the processing to step S13. When, the encoded image data is stored in the reception buffer (yes at step S11), the CPU 31 reads out the encoded image data from the reception buffer. The CPU 31 inputs the encoded image data into the image decoder, and acquires the image data decoded in accordance with the predetermined video parameters. The CPU 31 transmits the image data to the display control portion 34 and causes the image data to be displayed on the monitor 41 (step S12). Video based on the image data captured by the other terminals 3 is displayed on the monitor 41. Further, in the camera control processing that will be explained later (refer to FIG. 4), the CPU 31 also transmits the image data captured by the camera 44 of the one terminal 3 to the display control portion 34, and causes the captured image data to be displayed on the monitor 41 alongside the image data of the other terminals 3. Note that, in the camera control processing to be explained later (refer to FIG. 4), the CPU 31 generates composite image data based on the image data, in accordance with conditions.

When the composite image data is generated, the CPU 31 transmits the composite image data to the display control portion 34 in place of the image data captured by the camera 44 of the one terminal 3, and causes the composite image data to be displayed on the monitor 41 alongside the image data of the other terminals 3.

It should be noted that the CPU 31 may display each of the image data received from the plurality of terminals 3 via the conference server 1 alongside each other on the monitor 41 using individual window displays. Alternatively, the CPU 31 may align the plurality of image data as a tile formation and combine them as single image data and display them on the monitor 41. Alternatively, a CPU (not shown in the drawings) of the conference server 1 may perform processing to align the respective image data of the plurality of terminals 3 as a tile formation and combine them as single image data, encodes the single image data as the encoded image data and transmit the encoded image data to the one terminal 3.

The CPU 31 advances the processing to step S13 and determines whether it is a timing to transmit the image data captured by the camera 44 to the other terminals 3 via the conference server 1 (step S13). The frame rate of the image data is 30 fps, for example. The CPU 31 encodes the image data every $\frac{1}{30}^{th}$ of a second, for example, in line with the frame rate, and transmits the encoded image data to the other terminals 3. When it is not the timing to transmit the image data (no at step S13), the CPU 31 advances the processing to step S18. When the processing to terminate the remote conference has not been performed in the main processing (no at step S18), the CPU 31 returns the processing to step S11 and repeatedly performs the processing from step S11 to step S18.

During the time that the video transmission/reception processing is being repeatedly performed, when it becomes the timing to transmit the image data (yes at step S13), the CPU 31 determines whether the composite image data is stored in the RAM 33 (step S15). The composite image data is generated in the camera control processing to be explained later (refer to FIG. 4), by combining a plurality of extracted image data that are extracted from the image data into single image data in accordance with conditions. The composite image data is stored in a predetermined storage area of the RAM 33. When the composite image data is not stored in the RAM 33 (no at step S15), the CPU 31 performs processing to transmit the image data captured by the camera 44 to the other terminals 3. In this case, of image data stored in a camera buffer (to be explained later), the CPU 31 reads out the image data of a frame that is to be transmitted. The CPU 31 inputs the image data to the image encoder and acquires the encoded image data that is encoded in accordance with the predetermined video parameters. The CPU 31 stores the encoded image data in the transmission buffer. As described above, the CPU 31 transmits the encoded image data stored in the transmission buffer to the conference server 1 in accordance with the OS (step S16). The CPU 31 advances the processing to step S18 and continuously performs the video transmission/reception processing during the period in which the terminal 3 is participating in the remote conference.

At the timing to transmit the image data, when the composite image data is stored in the RAM 33 (yes at step S15), the CPU 31 performs processing to transmit the composite image data to the other terminals 3. The CPU 31 inputs the composite image data read out from the RAM 33 into the image encoder and acquires the encoded image data that is encoded in accordance with the predetermined video parameters. The CPU 31 stores the encoded image data in the transmission buffer. As described above, the CPU 31 transmits the encoded image data of the composite image data stored in the transmission buffer to the conference server 1 in accordance with the OS (step S17). The CPU 31 advances the processing to step S18 and continuously performs the video transmission/reception processing during the period in which the terminal 3 is participating in the remote conference.

When the conference termination processing is performed in the main processing and the conference termination notification event is generated while the video transmission/reception processing is being repeatedly performed (yes at step S18), the CPU 31 terminates the execution of the video transmission/reception processing.

Figure 4:
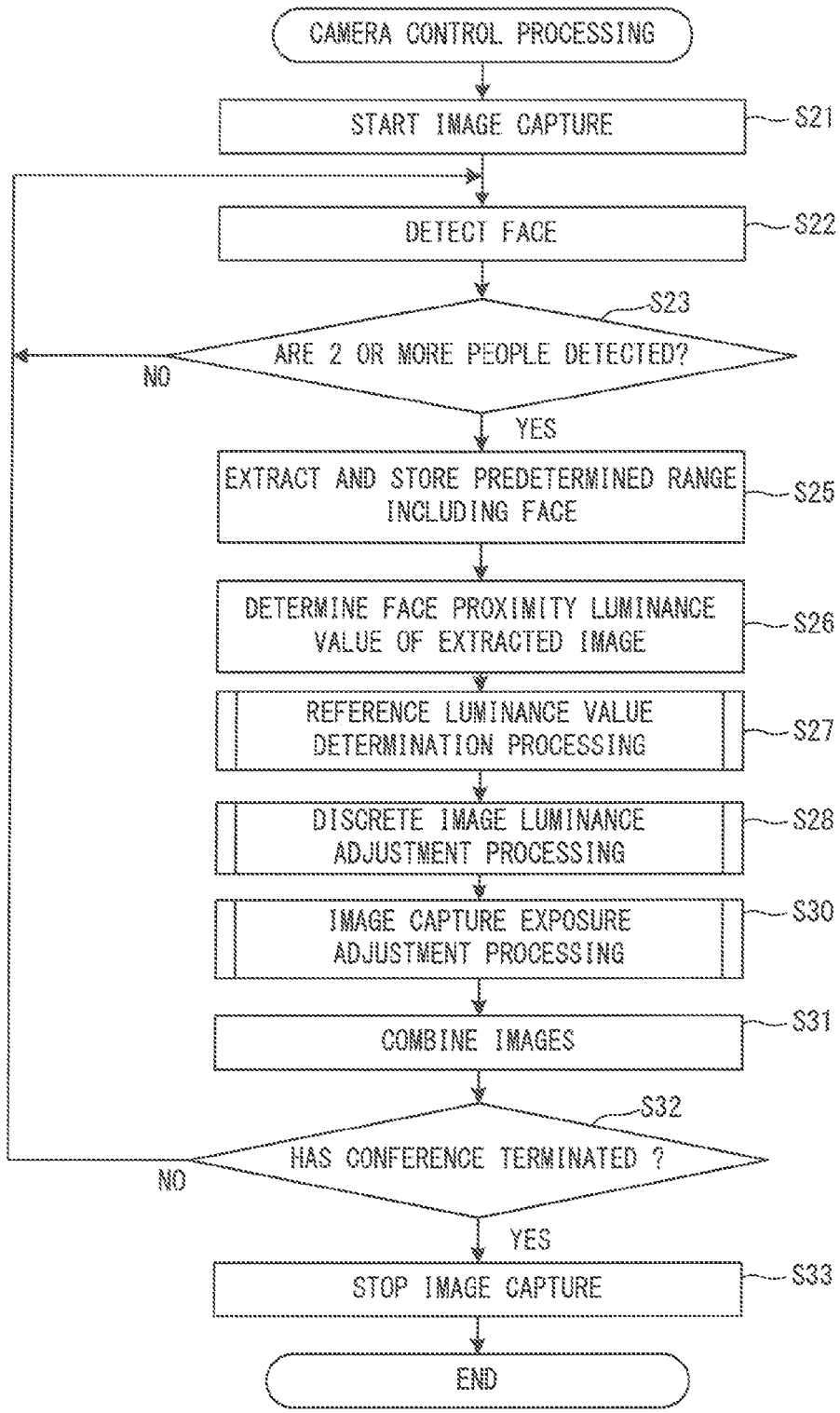
FIG. 4 is flowchart of camera control processing in the execution of the remote conference program.

Next, the camera control processing that is started by the CPU 31 at step S3 of the main processing of the remote conference program will be explained. As shown in FIG. 4, in the camera control processing, the CPU 31 transmits the command to the camera driver to activate the camera 44. The camera driver outputs an activation instruction to the camera 44, and activates the camera 44. The activation instruction includes the exposure setting instruction, and the camera 44 sets the exposure in accordance with the exposure parameters and starts image capture (step S21). The camera driver secures a storage area of the camera buffer in the RAM 33. The camera buffer is a storage area to temporarily store the image data captured by the camera 44. The camera driver starts processing that stores the image data acquired from the camera 44 via the USB I/F 39 in the camera buffer.

Of the image data stored in the camera buffer, the CPU 31 reads out the image data of a frame that is to be processed. The CPU 31 analyzes the image data using a known algorithm, and performs face detection processing (step S22). The face detection processing is, for example, processing in which, while scanning the image data using a search window of a predetermined pixel size, feature quantities of pixels in the search window are compared using a discriminator that has been caused to learn the feature quantities of the human face in advance, and it is thereby determined whether a human face is included in the search window. Details of the face detection processing are known and an explanation thereof is omitted here. When a face is detected from the image data, the CPU 31 records a position of the detected face.

The CPU 31 determines whether two or more human faces have been detected from the image data (step S23). When a face has not been detected from the image data, or when there is one human face detected (no at step S23), the CPU 31 returns the processing to step S22, and performs the face detection processing on the image data of the next frame. When two or more human faces have been detected from the image data (yes at step S23), the CPU 31 extracts, from the image data, extracted image data that is cut as an image of a predetermined range that includes positions of the detected faces, and stores the extracted image data in the RAM 33 (step S25).

Figure 8:
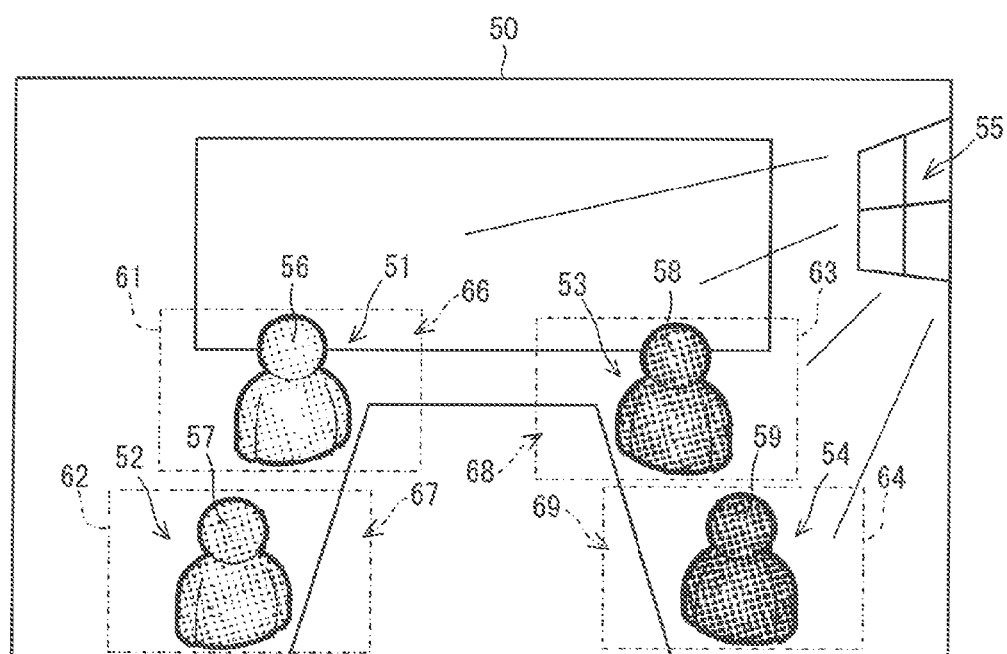
FIG. 8 is a diagram showing an example of an image 50 captured by a camera 44 in a remote conference.

For example, as shown in FIG. 8, an example is given of a case in which four people 51 to 54 are included in an image 50 represented by the image data. The people 51 to 54 are respectively facing the front surface side of the image 50 (the front side of the drawing) and are arranged one above the other in two rows on the right and the left. The people 51 to 54 are illuminated by light coming through a window 55 that is shown in an upper right corner portion of the image 50. Faces 56 and 57 of the people 51 and 52 who are side-by-side in the left row in the image 50 are illuminated by the light coming through the window 55 and the display of the faces 56 and 57 is bright. The face 56 of the person 51 who is positioned in a location closer to the window 55 than the person 52 is displayed more brightly than the face 57 of the person 52. For faces 58 and 59 of the people 53 and 54 who are side-by-side in the right row in the image 50, the backs of their heads are illuminated by the light coming through the window 55, and the front side is in shadow. The display of the faces 58 and 59 are therefore darker than the display of the faces 56 and 57 of the people 51 and 52. The face 59 of the person 54 who is positioned in a location farther from the window 55 than the person 53 is displayed more darkly than the face 58 of the person 53.

In the face detection processing, the CPU 31 detects the four faces 56 to 59 from the image 50 of the image data. The CPU 31 sets extracted areas 61 to 64 on the image 50, which are areas respectively including the faces 56 to 59. For example, the extracted area 61 is an area that is encompassed by a rectangular frame having an area roughly 10 times the size of the area of the face 56, with the same aspect ratio as the image 50. Within the image 50, the CPU 31 sets the extracted area 61 in a position in which the face 56 can be arranged roughly in the center of the area in the left-right direction and in an upper portion in the up-down direction. The CPU 31 sets the extracted areas 62 to 64 in a similar manner.

Figure 9:
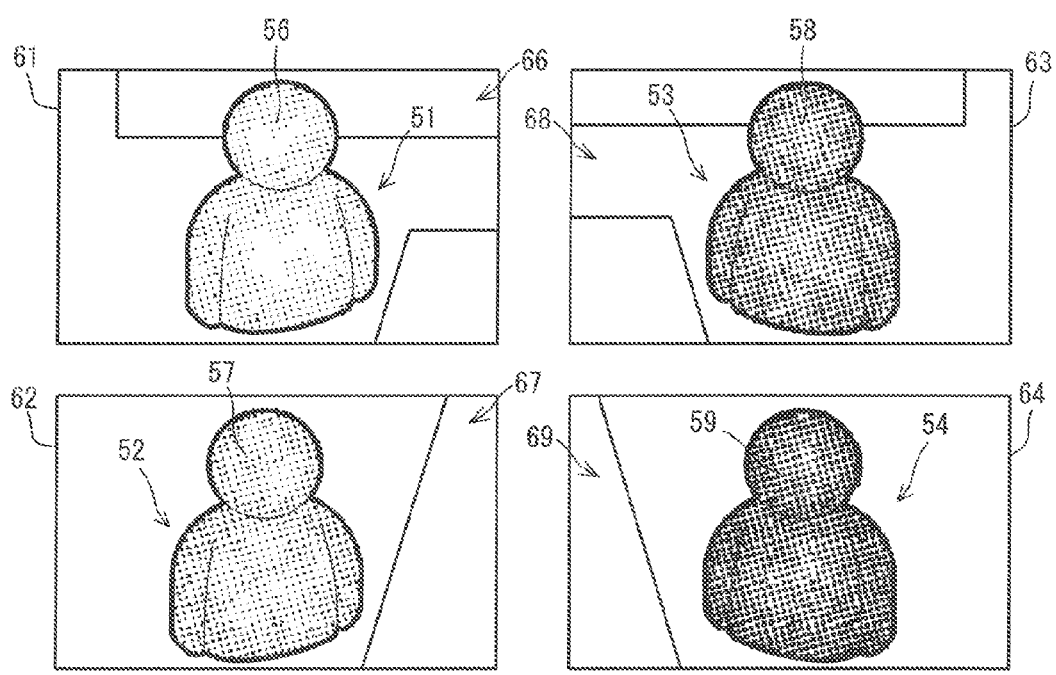
FIG. 9 is a diagram showing an example of an image represented by extracted image data 66 to 69.

As shown in FIG. 9, the CPU 31 stores extracted image data 66 to 69 in the RAM 33, the extracted image data 66 to 69 respectively corresponding to the cut out portions of the extracted areas 61 to 64 from the image 50. Images shown by each of the extracted image data 66 to 69 respectively include the faces 56 to 59 of the people 51 to 54. The faces 56 to 59 are respectively influenced by the light coming through the window 55, and are displayed as faces having different brightness (luminance), including a light face, a dark face and a face of brightness in between light and dark. It should be noted that the settings of the above-described extracted areas 61 to 64 are an example. For example, the CPU 31 may set the image 50 such that the size of the extracted areas 61 to 64 is slightly larger than the size of the faces 56 to 59, and the faces 56 to 59 are arranged in the center of the extracted areas 61 to 64.

As shown in FIG. 4, the CPU 31 analyzes each of the extracted image data stored in the RAM 33 and determines a luminance value in the vicinity of the face (hereinafter referred to as a "face proximity luminance value") of the extracted image data (step S26). The face proximity luminance value is a luminance value that represents a luminance value of the extracted image data. Note that luminance values of respective pixels that configure the extracted image data are referred to collectively as the extracted image data luminance value. Further, in the present embodiment, of the pixels that configure the extracted image data, an average value of the luminance values of pixels of a portion showing the face is determined to be the face proximity luminance value that represents the luminance value of the extracted image data. Based on the position of the face recorded in the face detection processing, the CPU 31 acquires the luminance values of the pixels of the portion showing the face, from the extracted image data. The CPU 31 calculates the average value of the acquired luminance values and determines the face proximity luminance value, associates the average value with the extracted image data and stores the associated data in the RAM 33. The CPU 31 respectively determines the face proximity luminance value for all of the extracted image data stored in the processing at step S25. It should be noted that the average value used for the face proximity luminance value need not necessarily be the arithmetical mean of the luminance values of the pixels of the portion showing the face. For example, the face proximity luminance value may be the luminance value of a pixel positioned in the center of a luminance histogram (namely, a median value), among the pixels of the portion showing the face. For example, the face proximity luminance value may be a highest luminance value (namely, the mode value), among the luminance values of the pixels of the portion showing the face. In other words, the average value means the inclusion of the arithmetical mean, the median value or the mode value. Further, for example, the face proximity luminance value may be the average value of the luminance values of the pixels of the portion showing the face and of the pixels surrounding that portion. For example, the face proximity luminance value may be the average value of the luminance values of all the pixels configuring the extracted image data. In addition, for example, the face proximity luminance value need not necessarily be the calculated average value, and the luminance value of a pixel whose coordinate position is central among the pixels of the portion showing the face may be used as the face proximity luminance value.

The CPU 31 performs a sub-routine of reference luminance value determination processing (step S27). The reference luminance value is a luminance value that is used as a reference when adjusting the luminance value of each of the extracted image data based on the face proximity luminance value. In discrete image luminance adjustment processing (refer to FIG. 6) that will be explained later, the CPU 31 performs correction such that the face proximity luminance value of each of the extracted image data falls within an allowable luminance range that has the reference luminance value as its central value. The allowable luminance range is a range of luminance values that ranges between a luminance upper limit value and a luminance lower limit value with the reference luminance value as the central value. The luminance upper limit value is a value that is obtained by adding a predetermined second allowable value to the reference luminance value. The luminance lower limit value is a value that is obtained by subtracting the second allowable value from the reference luminance value. In the reference luminance value determination processing, when an input has been received of an operation to specify the image data displayed on the monitor 41, the CPU 31 can determine the reference luminance value that is used as the reference when correcting the luminance value of the extracted image data. The determination of the reference luminance value is performed based on the face proximity luminance value of the image data that has been specified (hereinafter also referred to as "specified image data") or on the extracted image data.

Figure 5:
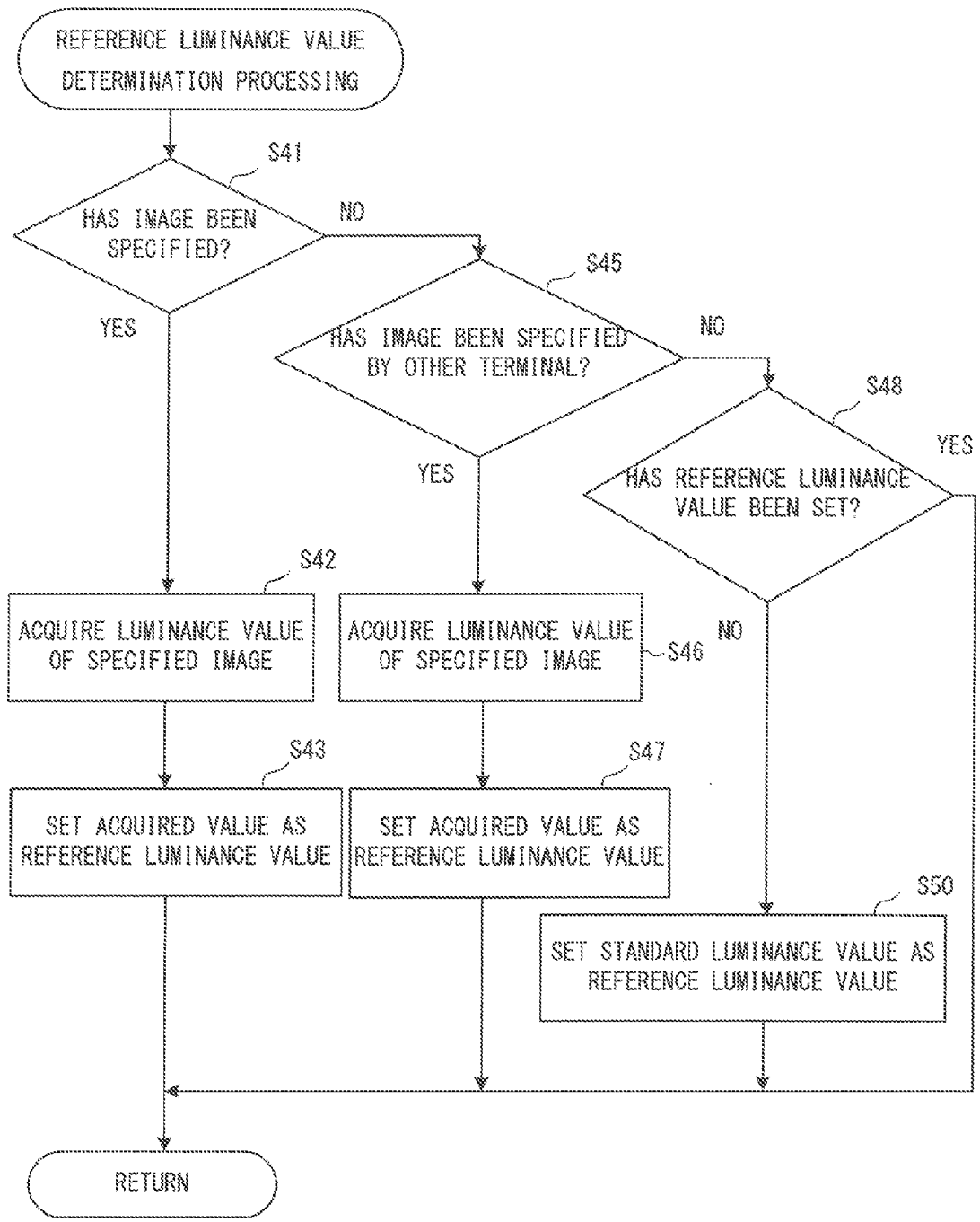
FIG. 5 is a flowchart of reference luminance value determination processing in the execution of the remote conference program.

As shown in FIG. 5, in the reference luminance value determination processing, the CPU 31 determines whether the input to specify one of the images has been received, based on the operation on the input portion 42 (step S41). Via the input portion 42, the CPU 31 receives the input of the operation that specifies one of the image data from among the image data of the other terminals 3 and the image data of the one terminal 3 which are displayed on the monitor 41. Further, when the image data displayed on the monitor 41 is the composite image data, the CPU 31 receives, via the input portion 42, the input of the operation specifying one of the extracted image data from among the plurality of extracted image data that configure the composite image data. When the input of the operation specifying the one image data or the one extracted image data has been received (yes at step S41), the CPU 31 acquires the face proximity luminance value of the specified image data (step S42). The face proximity luminance value of the specified image data is acquired by processing that is similar to that of the above-described case in which the face proximity luminance value of the extracted image data is determined. In other words, the CPU 31 performs the face detection processing on the specified image data. The CPU 31 acquires the luminance values of the pixels of the portion showing the detected face from the specified image data and calculates the average value of the acquired luminance values. The CPU 31 sets the calculated average value as the reference luminance value and stores the reference luminance value in the RAM 33 (step S43). Note that, when a face is not detected in the specified image data, the CPU 31 may set the average value of the luminance values of all the pixels of the image data as the reference luminance value. Further, when a plurality of faces are detected in the specified image data, the CPU 31 may set an average value of each of the face proximity luminance values of the plurality of faces as the reference luminance value. After setting the reference luminance value, the CPU 31 returns the processing to the camera control processing (refer to FIG. 4) of the remote conference program, and advances the processing to step S28.

In addition, also when the input of the operation specifying the image data or the extracted image data has been received on one of the other terminals 3, the CPU 31 of the one terminal 3 can determine the reference luminance value that is used as the reference when correcting the luminance value of the extracted image data. The determination of the reference luminance value is performed based on the face proximity luminance value of the specified image data. When the input of the operation to specify the image data or the extracted image data has not been received by the input portion 42 of the one terminal 3 (no at step S41), the CPU 31 determines whether a notification specifying the image data or the extracted image data (hereinafter also referred to as "specification information") has been received from one of the other terminals 3 via the conference server 1 (step S45). Note that the terminal 3 that participates in the conference using the user ID to which special authorization (such as an authorization to chair the conference etc.) has been assigned, for example, can transmit the specification information to the other terminals 3 via the conference server 1. When the CPU 31 of the one terminal 3 has received the specification information (yes at step S45), the CPU 31 acquires the face proximity luminance value of the specified image data in a similar manner to that at step S42 (step S46). The CPU 31 sets the face proximity luminance value of the specified image data as the reference luminance value and stores the reference luminance value in the RAM 33 (step S47). After setting the reference luminance value, the CPU 31 returns the processing to the camera control processing (refer to FIG. 4) of the remote conference program, and advances the processing to step S28.

When the input of the operation specifying the image data or the extracted image data has not been received (no at step S41) and when the specification information has also not been received (no at step S45), the CPU 31 determines whether the reference luminance value has been set (step S48). When the reference luminance value determination processing is performed for the first time, the reference luminance value has not been set (no at step S48). Thus, the CPU 31 sets a predetermined standard luminance value as the reference luminance value and stores the reference luminance value in the RAM 33 (step S50). The CPU 31 returns the processing to the camera control processing (refer to FIG. 4) of the remote conference program, and advances the processing to step S28. When the reference luminance value determination processing is performed from the second time onward, the reference luminance value has been set (yes at step S48). Thus, the CPU 31 returns the processing to the camera control processing (refer to FIG. 4) of the remote conference program, and advances the processing to step S28.

Figure 6:
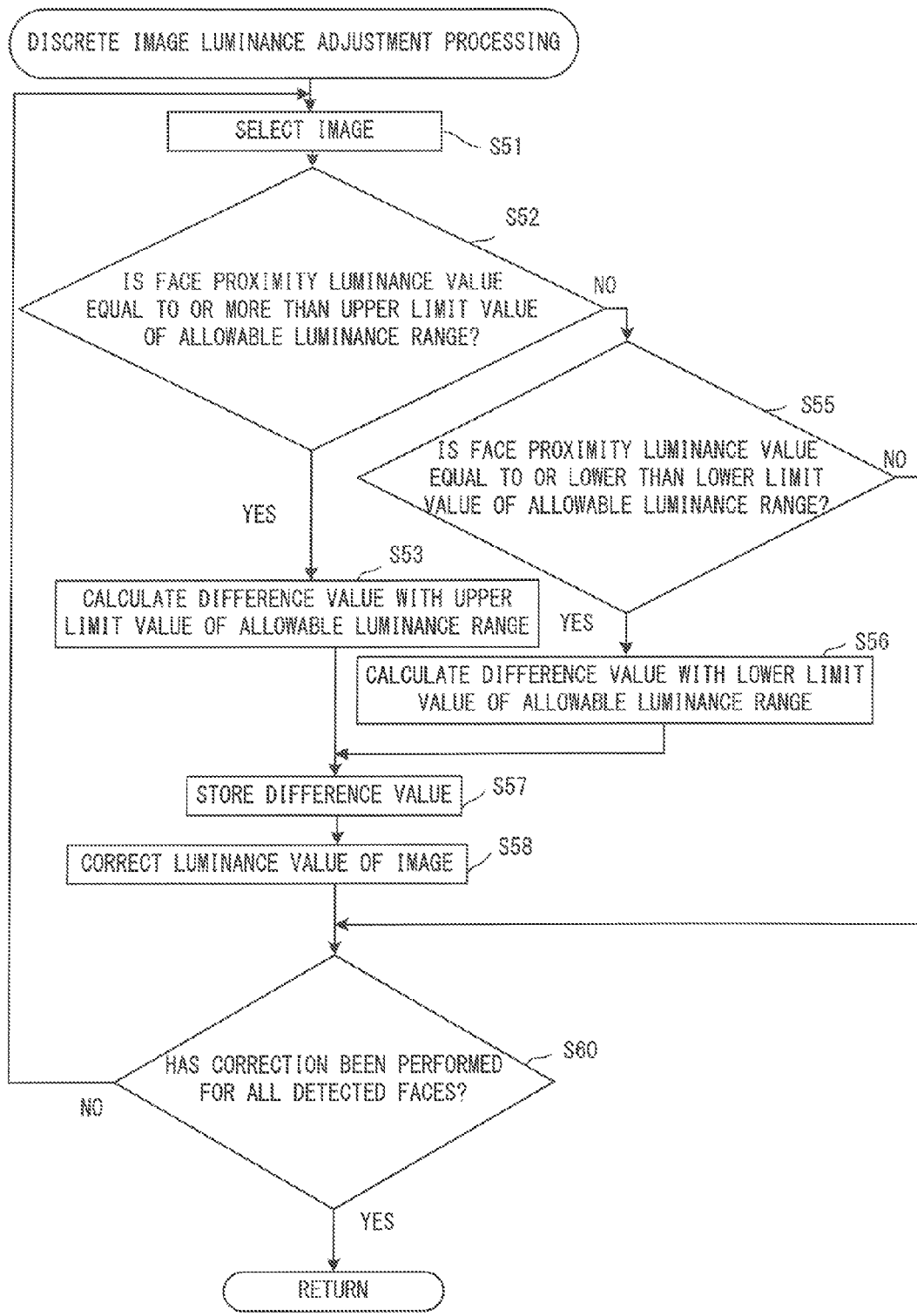
FIG. 6 is a flowchart of discrete image luminance adjustment processing in the execution of the remote conference program.

As shown in FIG. 4, when the CPU 31 returns the processing from the reference luminance value determination processing to the camera control processing, it performs the sub-routine of the discrete image luminance adjustment processing (step S28). The discrete image luminance adjustment processing is processing that corrects the face proximity luminance value of each of the extracted image data to be within the allowable luminance range that has the reference luminance value as its central value. As shown in FIG. 6, in the discrete image luminance adjustment processing, the CPU 31 selects one of the plurality of extracted image data stored in the RAM 33 by the processing at step S25, and takes the selected extracted image data as a target for luminance value adjustment (step S51). The CPU 31 reads out the face proximity luminance value of the selected extracted image data from the RAM 33, and compares the face proximity luminance value with the luminance upper limit value of the allowable luminance range (step S52). As described above, the allowable luminance range has the reference luminance value determined in the reference luminance value determination processing (refer to FIG. 5) as its central value, and is a range of luminance values between the luminance upper limit value and the luminance lower limit value. The exposure upper limit value is a value that is obtained by adding the predetermined second allowable value to the reference luminance value. The exposure lower limit value is a value that is obtained by subtracting the second allowable value from the reference luminance value.

When the face proximity luminance value is equal to or greater than the luminance upper limit value of the allowable luminance range (yes at step S52), the CPU 31 subtracts the luminance upper limit value of the allowable luminance range from the face proximity luminance value and thus calculates a difference value (step S53). In this case, the difference value is a positive value. The CPU 31 stores the difference value in the RAM 33 (step S57) and corrects the luminance value of the extracted image data based on the difference value (step S58). Specifically, the CPU 31 performs processing that changes each of the luminance values, for all the pixels configuring the extracted image data, to the luminance value calculated by subtracting the difference value from the original luminance value. The luminance value of all the pixels is corrected to a smaller value by an absolute value of the difference value, and thus the face proximity luminance value of the extracted image data after the correction becomes the luminance upper limit value of the allowable luminance range, and falls within the allowable luminance range. When there is not yet selected extracted image data in the RAM 33 and the correction with respect to each of the extracted image data corresponding to the number of faces that have been detected is not complete (no at step S60), the CPU 31 returns the processing to step S51.

When the face proximity luminance value of the extracted image data selected by the CPU 31 is less than the luminance upper limit value of the allowable luminance range (no at step S52) and is equal to or less than the luminance lower limit value of the allowable luminance range (yes at step S55), the CPU 31 calculates a difference value that is obtained by subtracting the luminance lower limit value of the allowable luminance range from the face proximity luminance value (step S56). In this case, the difference value is a negative value. The CPU 31 stores the difference value in the RAM 33 (step S57) and corrects the luminance value of the extracted image data based on the difference value (step S58). In a similar manner to that described above, the CPU 31 performs processing that changes each of the luminance values, for all the pixels configuring the extracted image data, to the luminance value calculated by subtracting the difference value from the original luminance value. As the difference value is a negative value, the luminance value of all the pixels is corrected to a greater value by an absolute value of the difference value. The face proximity luminance value of the extracted image data after the correction becomes the luminance lower limit value of the allowable luminance range, and falls within the allowable luminance range. The CPU 31 stores the extracted image data for which the luminance value has been corrected in the RAM 33. In a similar manner to that described above, when the correction is not complete for all of the extracted image data (no at step S60), the CPU 31 returns the processing to step S51.

When the face proximity luminance value of the extracted image data selected by the CPU 31 is less than the luminance upper limit value of the allowable luminance range (no at step S52) and is greater than the luminance lower limit value of the allowable luminance range (no at step S55), the face proximity luminance value is a value that is within the allowable luminance range. In this case, the CPU 31 does not perform the correction on the luminance value of the extracted image data and advances the processing to step S60. When the CPU 31 completes the correction for all the extracted image data (yes at step S60), the CPU 31 returns the processing to the camera control processing (refer to FIG. 4) of the remote conference program and advances the processing to step S30.

Figure 7:
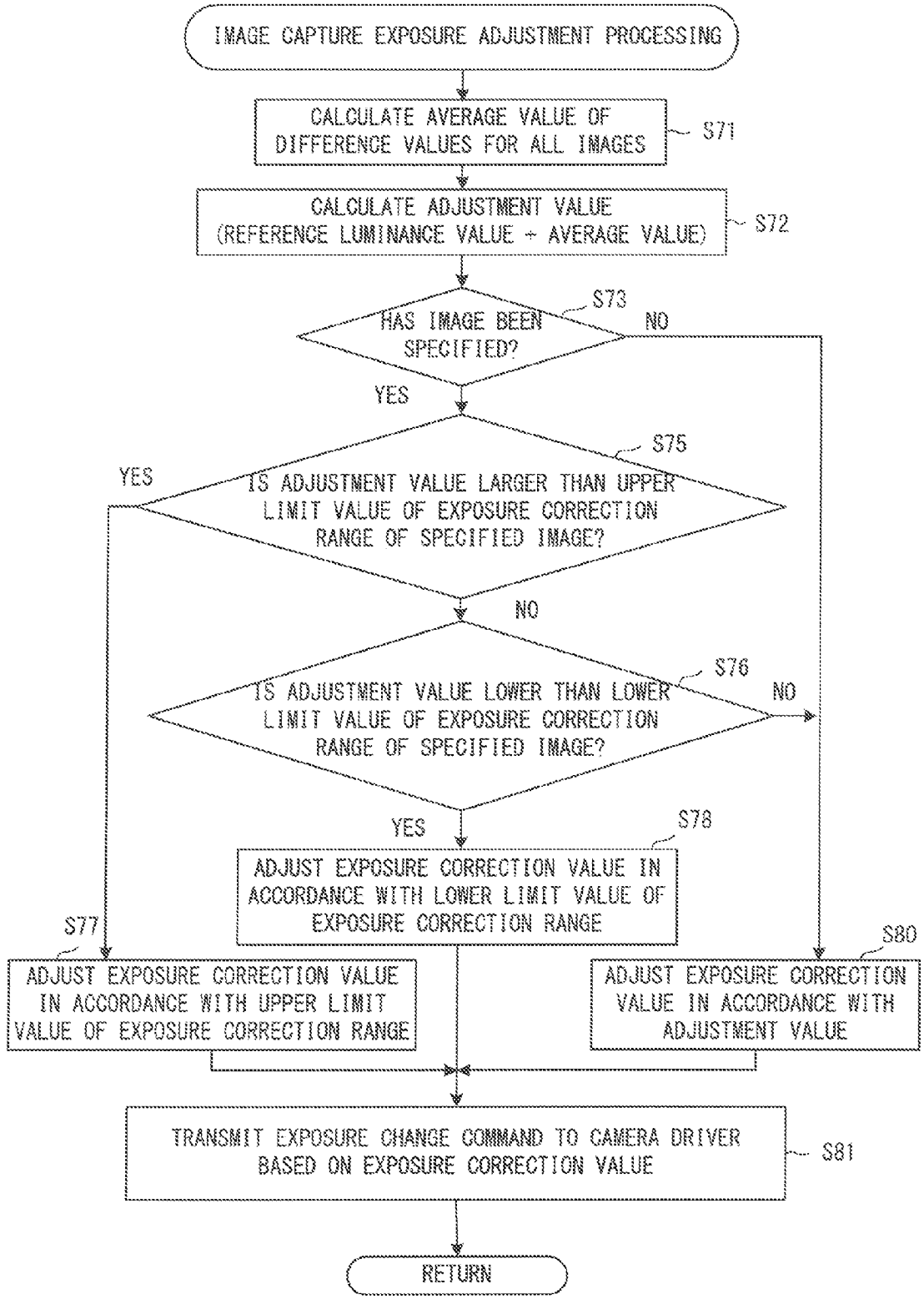
FIG. 7 is a flowchart of image capture exposure adjustment processing in the execution of the remote conference program.

As shown in FIG. 4, after the CPU 31 returns the processing to the camera control processing from the discrete image luminance adjustment processing, the CPU 31 performs a sub-routine of image capture exposure adjustment processing (step S30). The image capture exposure adjustment processing is processing that outputs to the camera driver the change command to change the exposure of the camera 44, in order to minimize a difference between the face proximity luminance value of the extracted image data and the reference luminance value. As shown in FIG. 7, in the image capture exposure adjustment processing, the CPU 31 calculates an average value of the plurality of difference values stored in the RAM 33 by the processing at step S57 (step S71). The magnitude of average displacement, from the reference luminance value, of the face proximity luminance value of the extracted image data for which the face proximity luminance value did not fall within the allowable luminance range, is calculated as the average value of the difference values. The CPU 31 calculates an adjustment value (step S72). The adjustment value is a value obtained by displacing the reference luminance value by the average value for example, and is used to determine whether to perform adjustment of the exposure correction value based on the average value. The CPU 31 adds the average value to the reference luminance value and thus calculates the adjustment value.

In a similar manner to that described above, when there is no input of the operation specifying the image data or the extracted image data, and the specification information has not been received (no at step S73), the CPU 31 adjusts the exposure correction value in accordance with the adjustment value (step S80). The average value that is the basis of calculation of the adjustment value is reflected in the exposure correction value. As described above, the exposure correction value is a value of the change amount of the luminance value of the image data captured by the camera 44 and is specified by the CPU 31. Specifically, the exposure correction value is a value that specifies the change amount of the luminance value based on the average value before the change in exposure, such that the average value of the plurality of difference values becomes a value less than the average value before the change in exposure (and is preferably zero). The plurality of difference values are the respective difference values between the reference luminance value and the face proximity luminance values of the plurality of extracted image data extracted from the image data of the camera 44 after the change in exposure. The control to correct the exposure of the camera 44 is performed by the camera driver based on the exposure correction value. The CPU 31 transmits the change command including the exposure correction value to the camera driver (step S81). As described above, when the camera driver receives the change command, the camera driver changes the exposure parameters in accordance with the exposure correction value and outputs the exposure setting instruction to the camera 44. The camera 44 corrects the exposure in accordance with the exposure setting instruction, and outputs image data captured using the exposure after the correction. The CPU 31 returns the processing to the camera control processing (refer to FIG. 4) of the remote conference program, and advances the processing to step S31.

In the processing at step S73, when there is the input of the operation specifying the image data or the extracted image data, or when the specification information is received (yes at step S73), the CPU 31 compares the adjustment value with an exposure correction range that is based on the face proximity luminance value of the specified image data (step S75 and step S76). The exposure correction range is a range of luminance values that has the face proximity luminance value of the specified image data as its central value and that ranges between an exposure upper limit value and an exposure lower limit value. The exposure upper limit value is a value that is obtained by adding a predetermined first allowable value to the face proximity luminance value. The exposure lower limit value is a value that is obtained by subtracting the predetermined first allowable value from the face proximity luminance value. When the adjustment value is greater than the exposure upper limit value of the exposure correction range (yes at step S75), the CPU 31 adjusts the exposure correction value in accordance with the exposure upper limit value (step S77). Namely, when the face proximity luminance value of the image data after the change in exposure is a large value that exceeds the face proximity luminance value of the specified image data by an amount in excess of the first allowable value, the CPU 31 adjusts the exposure correction value in accordance with the exposure upper limit value. The adjustment of the exposure correction value in accordance with the exposure upper limit value is an adjustment that is made such that the face proximity luminance value of the image data becomes a value that is obtained by adding the first allowable value to the face proximity luminance value of the specified image data. The CPU 31 transmits the change command including the exposure correction value to the camera driver (step S81). The CPU 31 returns the processing to the camera control processing (refer to FIG. 4) of the remote conference program, and advances the processing to step S31.

Further, when the adjustment value is less than the exposure lower limit value of the exposure correction range (no at step S75 and yes at step S76), the CPU 31 adjusts the exposure correction value in accordance with the exposure lower limit value (step S78). Namely, when the face proximity luminance value of the image data after the change in exposure is a value that is less than the face proximity luminance value of the specified image data by an amount in excess of the first allowable value, the CPU 31 adjusts the exposure correction value in accordance with the exposure lower limit value. The adjustment of the exposure correction value in accordance with the exposure lower limit value is an adjustment that is made such that the face proximity luminance value of the image data becomes a value that is obtained by subtracting the first allowable value from the face proximity luminance value of the specified image data. The CPU 31 transmits the change command including the exposure correction value to the camera driver (step S81). The CPU 31 returns the processing to the camera control processing (refer to FIG. 4) of the remote conference program, and advances the processing to step S31.

When the adjustment value is a value within the exposure correction range (no at step S75 and no at step S76), the CPU 31 advances the processing to step S80. In a similar manner to that described above, when the CPU 31 adjusts the exposure correction value in accordance with the adjustment value (step S80) and transmits the change command including the exposure correction value to the camera driver (step S81), the CPU 31 then advances the processing to step S31 of the camera control processing (refer to FIG. 4).

As shown in FIG. 4, when the CPU 31 returns the processing to the camera control processing from the image capture exposure adjustment processing, the CPU 31 combines the extracted image data (step S31). The CPU 31 reads out the plurality of extracted image data for which the luminance value has been corrected in the processing at step S58 from the RAM 33, and generates the composite image data that represents a composite image in which images represented by each of the extracted image data are arranged side by side in a single image formation area. The CPU 31 stores the composite image data in the RAM 33.

Figure 10:
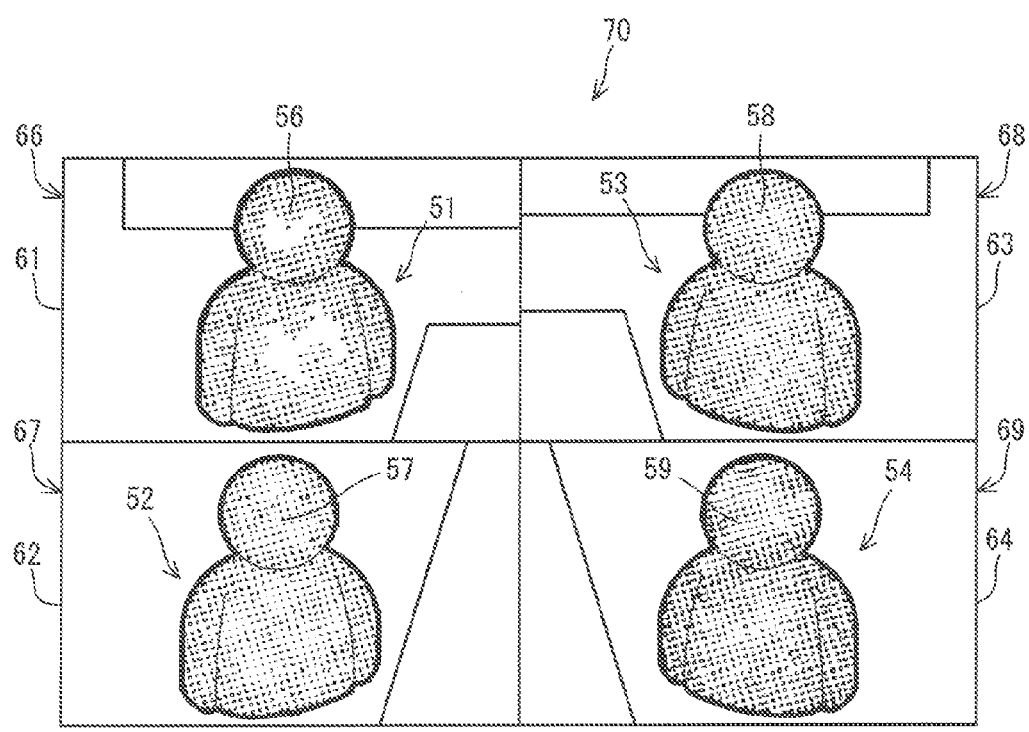
FIG. 10 is a diagram showing an example of a composite image 70.

As shown in FIG. 10, the CPU 31 generates the composite image data that represents a single composite image 70 in which images represented by each of the extracted image data 66 to 69 are arranged in a tile formation, for example. The faces 56 to 59 of the people 51 to 54 respectively displayed in the images represented by each of the extracted image data 66 to 69 are faces having a brightness that has been corrected so as to be closer to the reference luminance value than the respective luminance values before the respective luminance values are corrected. Specifically, the differences between the respective face proximity luminance values of the faces 56 to 59 are less than before the correction of the luminance values. Thus, in the composite image 70 represented by the composite image data, the variations in the luminance values of each of the extracted image data 66 to 69 are less than before the correction of the luminance values. As a result, in the composite image 70, the variations in the luminance values of the image as a whole are less than before the correction of the luminance values, and in comparison to a case in which the combining of the images is performed without performing the luminance value correction, the composite image 70 is an image in which the unnaturalness of changes in the luminance values within the image is alleviated.

As shown in FIG. 4, when the processing to terminate the remote conference has not been performed in the main processing (no at step S32), the CPU 31 returns the processing to step S22. The CPU 31 extracts the extracted image data from the not yet processed image data, in accordance with the conditions, and repeatedly performs the processing from step S22 to step S32 to generate the composite image data. When the remote conference terminate processing is performed in the main processing and the notification event for the termination of the remote conference has occurred while the processing from step S22 to step S32 is being repeatedly performed (yes at step S32), the CPU 31 transmits a command to the camera driver to stop the driving of the camera 44 (step S33). The camera driver outputs a stop instruction to the camera 44 and stops the driving of the camera 44. The CPU 31 terminates the execution of the camera control processing.

As explained above, the CPU 31 can reduce the differences in the luminance values of the plurality of extracted image data that configure the composite image data by correcting the luminance values of the respectively corresponding extracted image data with the plurality of difference values based on the plurality of face proximity luminance values and the reference luminance value. As a result, the CPU 31 can provide the composite image in which variations in the luminance between the extracted image data are small, even if the changes in the luminance within the image are not based on the direction of light from the light source, thus providing the composite image that can suppress unnaturalness of the image as a whole. Further, by determining the exposure correction value based on the plurality of difference values, the CPU 31 can change the exposure of the camera 44 in accordance with the change command that is based on the exposure correction value. Specifically, the exposure correction value is determined such that the average value of the plurality of difference values can be made a value that is less than the average value before the change in exposure (and that is preferably zero). In other words, the exposure correction value is determined such that the average value of the plurality of face proximity luminance values after the change in exposure can be made a value that is closer to the reference luminance value than before the change in exposure (and that is preferably equal to the reference luminance value). In this way, the face proximity luminance values that are respectively determined for the plurality of extracted image data that are determined with respect to the image data of the camera 44 after the change in exposure each come closer to the reference luminance value. Thus, even without correcting the respective luminance values of the plurality of extracted image data, in the composite image, the CPU 31 can minimize the differences in the luminance values of the respective extracted image data. As a result, the CPU 31 can reduce a load of the arithmetic calculation to determine the exposure correction value.

The CPU 31 can calculate the adjustment value involved in the determination of the exposure correction value based on the average value of the plurality of difference values. Thus, among the images of the plurality of extracted image data determined with respect to the image data acquired from the camera 44 after the change in exposure, there are no extremely bright images and extremely dark images. As a result, even if the changes in the luminance within the image are not based on the direction of the light from the light source, the CPU 31 can provide the composite image in which the variations in the luminance between the extracted image data are small, thus providing the composite image that can suppress unnaturalness of the image as a whole.

The CPU 31 can correct the luminance value of each of the extracted image data such that the respective face proximity luminance values of the plurality of extracted image data determined with respect to the image data acquired from the camera 44 after the change in exposure come closer to the face proximity luminance value of the specified image data. As a result, the CPU 31 can generate the composite image that is close to the face proximity luminance value of the specified image data. When the specified image data is selected based on the input of the operation on the input portion 42, the CPU 31 can cause the face proximity luminance values of the plurality of extracted image data determined with respect to the image data acquired from the camera 44 after the change in exposure to come closer to the face proximity luminance value of the specified image data. As a result, the CPU 31 can generate the composite image to easily distinguish the images of each of the extracted image data, in accordance with characteristics of a display screen of the terminal 3. Further, when the specified image data is selected based on the specification information received from one of the other terminals 3, the CPU 31 of the one terminal 3 can cause the face proximity luminance values of the plurality of extracted image data determined with respect to the image data acquired from the camera 44 after the change in exposure to come closer to the face proximity luminance value of the specified image data selected by the other terminal 3. As a result, the CPU 31 can generate the composite image to easily distinguish the images of each of the extracted image data, in accordance with characteristics of a display screen of the other terminal 3.

When the specified image data has been selected, the CPU 31 can determine the exposure correction value in accordance with the face proximity luminance value of the specified image data. Further, when the adjustment value is outside the allowable luminance range of the reference luminance value, the CPU 31 can determine the exposure correction value based on the exposure upper limit value or the exposure lower limit value. As a result, for the images of the plurality of extracted image data determined with respect to the image data acquired from the camera 44 after the change in exposure, there are no extremely bright images and extremely dark images with respect to the specified image data. Therefore, even if the changes in the luminance within the image are not based on the direction of the light from the light source, the CPU 31 can provide the composite image in which the variations in the luminance between the extracted image data are small, thus providing the composite image that can suppress unnaturalness of the image as a whole.

When the absolute value of the difference value is equal to or greater than the second allowable value, the CPU 31 performs arithmetic calculation to determine the exposure correction value. Specifically, when the absolute value of the difference value is less than the second allowable value (in other words, it is within the allowable luminance range, namely, the face proximity luminance value is less than the luminance upper limit value and greater than the luminance lower limit value), the CPU 31 need not determine the difference value with respect to the extracted image data, and further need not perform the arithmetic calculation to determine the exposure correction value. As a result, it is possible to reduce the load involved in the arithmetic calculation.

When the face proximity luminance value is equal to or greater than the luminance upper limit value, the CPU 31 performs the correction based on the luminance upper limit value, and similarly, when the face proximity luminance value is equal to or lower than the reference luminance value, the CPU 31 performs the correction based on the luminance lower limit value. As a result, the CPU 31 can correct the luminance value of the extracted image data with a minimum magnitude of change such that the face proximity luminance value is included within the allowable luminance range, without a large change with respect to the luminance value before the correction. Therefore, the CPU 31 can acquire, as the images of each of the extracted image data in the composite image data, the images that appropriately reflect the respective luminances of the images of each of the corresponding extracted image data in the original image data.

The CPU 31 can determine, as the extracted image data, the predetermined area that includes the position of the face. Thus, in the composite image that is formed by combining the images of the plurality of extracted image data determined with respect to the image data acquired from the camera 44 after the change in exposure, there are no images in which the face image is extremely bright and no images in which the face image is extremely dark. As a result, the CPU 31 can generate the composite image data in which the faces can be easily distinguished.

Note that the present disclosure is not limited to the above-described embodiment and various changes are possible. For example, the terminal 3 is not limited to a laptop or tower type PC, and may be a notebook PC, a smart phone, a tablet terminal or the like. Specifically, it is sufficient that the terminal 3 be a terminal device that can execute the remote conference program, can be connected to the network 8, can perform the image capture using the camera 44, and can display the image on the monitor 41 using the display control portion 34. Further, at least one of the microphone 43, the speaker 45, the camera 44 and the monitor 41 may be built into the terminal 3.

The CPU 31 is not limited to changing the brightness of the image data by changing the luminance value only, and the CPU 31 may change the brightness of the image data by changing other parameters, such as lightness, saturation, a gamma value etc. In addition, as the extracted image data, the CPU 31 may cut out only an area of the human face and, after correcting the luminance value, may generate the composite image data by overwriting the extracted location of the original image data.

What is claimed is:

1. A non-transitory computer-readable storage medium storing computer-readable instructions that, when executed by a processor of a terminal device, which is configured to perform transmission and reception of various data with a plurality of terminal devices connected via a network, causes the terminal device to perform processes comprising:
    a first generating processing generating a plurality of extracted image data from captured image data acquired by a camera connected to the terminal device, the plurality of extracted image data corresponding to portions in the captured image data, each of the extracted image data including a respective target to be extracted from the captured image data;
    a first determination processing determining a plurality of representative luminance values respectively representing luminances of the plurality of extracted image data;
    a second determination processing determining a plurality of luminance correction values corresponding to the plurality of extracted image data, respectively, based on a reference luminance value and the plurality of representative luminance values determined in the first determination processing, the reference luminance value being a reference value of luminance;
    a storage processing storing the plurality of luminance correction values determined in the second determination processing in a storage device provided in the terminal device;
    a second generating processing generating composite image data from the plurality of extracted image data, the respective luminance of each of the plurality of extracted image data having been corrected using a corresponding luminance correction value of the plurality of luminance correction values stored in the storage device in the storage processing; and
    a third determination processing determining, based on the plurality of luminance correction values stored in the storage device in the storage processing, an exposure correction value to correct an exposure of the camera, the third determination processing comprising:
        first calculation processing calculating an average value of the plurality of luminance correction values, and
        second calculation processing calculating a first addition value by adding the average value calculated in the first calculation processing and the reference luminance value,
    wherein the exposure correction value is determined based on the first addition value calculated in the second calculation processing.

2. The non-transitory computer-readable storage medium according to claim 1, wherein the instructions, when executed, further cause the terminal device to perform:
    first transmission processing transmitting, to the camera, a change command changing the exposure of the camera, based on the exposure correction value determined in the third determination processing.

3. The non-transitory computer-readable storage medium according to claim 1, wherein the instructions, when executed, further cause the terminal device to perform:
    selection processing selecting at least one of the extracted image data as a selected image data from among the extracted image data generated by the first generating processing; and
    setting processing setting, as the reference luminance value, a respective one of the representative luminance values representing the luminance of the selected image data.

4. The non-transitory computer-readable storage medium according to claim 3, wherein
    the selection processing comprises selecting at least one of the plurality of extracted image data as the selected image data based on an input of an operation received by an input portion provided in the terminal device.

5. The non-transitory computer-readable storage medium according to claim 3, wherein the instructions, when executed, further cause the terminal device to perform:
    second transmission processing transmitting the composite image data to another terminal device via the network, and
    wherein
        the selection processing comprises selecting at least one of the plurality of extracted image data as the selected image data based on specification information received from the other terminal device, the specification information specifying the selected image data selected from among the plurality of extracted image data included in the composite image data on the other terminal device.

6. The non-transitory computer-readable storage medium according to claim 3, wherein:
the third determination processing further comprises:
first judgment processing judging whether the selected image data is selected, and
second judgment processing judging whether the first addition value is included in a pre-set specific range, the reference luminance value being based on the luminance of the selected image data and being set in the setting processing, and wherein
the exposure correction value is determined based on a second addition value when the first judgment processing judging that the selected image data is selected and the second judgment processing judging that the first addition value is not included within the specific range, the second addition value being a value obtained by adding the reference luminance value and a predetermined first allowable value.

7. The non-transitory computer-readable storage medium according to claim 1, wherein:
the second determination processing further comprises
third judgment processing judging whether an absolute value of a difference value between one of the representative luminance values and the reference luminance value is equal to or greater than a second allowable value, and
the luminance correction value is determined with respect to a corresponding one of the extracted image data when the third judgment processing judges that the absolute value of the difference value is equal to or greater than the second allowable value.

8. The non-transitory computer-readable storage medium according to claim 7, wherein
the second determination processing comprises, for each of the luminance correction values:
determining the respective luminance correction value based on a luminance upper limit value when a corresponding one of the representative luminance values is equal to or greater than the luminance upper limit value, the luminance upper limit value being obtained by adding the second allowable value to the reference luminance value, and
determining the respective luminance correction value based on a luminance lower limit value when a corresponding one of the representative luminance values is equal to or less than the luminance lower limit value, the luminance lower limit value being obtained by subtracting the second allowable value from the reference luminance value.

9. The non-transitory computer-readable storage medium according to claim 1, wherein the instructions further perform a process comprising:
detection processing detecting a position of a face in the captured image data, and wherein
the first generating processing includes generating the plurality of extracted image data to include the detected position of the face.

10. A terminal device performing transmission and reception of various data with a plurality of terminal devices configured to be connected via a network, the terminal device comprising:
a processor, and
a memory storing computer-readable instructions, the instructions, when executed by the processor, perform processes comprising:
a first generating processing generating a plurality of extracted image data from captured image data acquired by a camera connected to the terminal device, the plurality of extracted image data corresponding to portions in the captured image data, and each of the extracted image data including a respective target to be extracted from the captured image data;
a first determination processing determining a plurality of representative luminance values respectively representing luminances of the plurality of extracted image data;
a second determination processing determining a plurality of luminance correction values corresponding to the plurality of extracted image data, respectively, based on a reference luminance value and the plurality of representative luminance values determined in the first determination processing, the reference luminance value being a reference value of luminance;
a storage processing storing the plurality of luminance correction values determined in the second determination processing in the memory;
a second generating processing generating composite image data from the plurality of extracted image data, the respective luminance of each of the plurality of extracted image data having been corrected using a corresponding luminance correction value of the plurality of luminance correction values stored in the memory; and
a third determination processing determining, based on the plurality of luminance correction values stored in the memory in the storage processing, an exposure correction value to correct an exposure of the camera, the third determination processing comprising:
first calculation processing calculating an average value of the plurality of luminance correction values, and
second calculation processing calculating a first addition value by adding the average value calculated in the first calculation processing and the reference luminance value,
wherein the exposure correction value is determined based on the first addition value calculated in the second calculation processing.

11. The terminal device according to claim 10, wherein the instructions further perform processes comprising:
transmission processing transmitting, to the camera, a change command changing the exposure of the camera, based on the exposure correction value determined in the third determination processing.

12. A method executed by a processor of a terminal device, which performs transmission and reception of various data with a plurality of terminal devices configured to be connected via a network, the method comprising:
first generating a plurality of extracted image data from captured image data acquired by a camera connected to the terminal device, the plurality of extracted image data corresponding to portions in the captured image data, each of the plurality of extracted image data including a respective target to be extracted from the captured image data;
first determining a plurality of representative luminance values respectively representing luminances of the plurality of extracted image data;
second determining a plurality of luminance correction values corresponding to the plurality of extracted image data, respectively, based on a reference luminance value and the plurality of representative luminance values determined in the first determining, the reference luminance value being a reference value of luminance;

storing the plurality of luminance correction values determined in the second determining in a storage device provided in the terminal device;

second generating composite image data from the plurality of extracted image data, the luminance of each of the plurality of extracted image data having been corrected using a corresponding luminance correction value of the plurality of luminance correction values stored in the storage device; and third determining, based on the plurality of luminance correction values stored in the storage processing, an exposure correction value to correct an exposure of the camera, the third determining comprising:

first calculation processing calculating an average value of the plurality of luminance correction values, and second calculation processing calculating a first addition value by adding the average value calculated in the first calculation processing and the reference luminance value, wherein the exposure correction value is determined based on the first addition value calculated in the second calculation processing.

13. The method according to claim 12, further comprising:

transmitting, to the camera, a change command changing the exposure of the camera, based on the exposure correction value determined in the third determining.

* * * * *